(12) United States Patent
Yang et al.

(10) Patent No.: US 9,769,850 B2
(45) Date of Patent: Sep. 19, 2017

(54) METHOD, DEVICE AND SYSTEM FOR TRANSMITTING DATA

(71) Applicant: Huawei Tecnologies Co., Ltd., Shenzhen (CN)

(72) Inventors: Lvxi Yang, Nanjing (CN); Peng Wang, Nanjing (CN); Fang Wang, Nanjing (CN); Xun Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 136 days.

(21) Appl. No.: 14/924,468

(22) Filed: Oct. 27, 2015

(65) Prior Publication Data
US 2016/0050693 A1  Feb. 18, 2016

Related U.S. Application Data

(63) Continuation of application No. PCT/CN2013/087240, filed on Nov. 15, 2013.

(30) Foreign Application Priority Data

Apr. 28, 2013  (CN) .......................... 2013 1 0155579

(51) Int. Cl.
*H04W 74/08*  (2009.01)
*H04W 72/04*  (2009.01)

(52) U.S. Cl.
CPC ... *H04W 74/0816* (2013.01); *H04W 72/0446* (2013.01)

(58) Field of Classification Search
CPC ......... H04W 74/0816; H04W 72/0446; H04W 74/08; H04B 7/0617
See application file for complete search history.

(56) References Cited

U.S. PATENT DOCUMENTS

2005/0135295 A1* 6/2005 Walton .............. H04W 74/0816
                                                           370/328
2005/0208956 A1* 9/2005 Takagi .............. H04W 74/0816
                                                           455/464
(Continued)

FOREIGN PATENT DOCUMENTS

CN          101150442 A          3/2008
CN          101656644 A          2/2010
(Continued)

OTHER PUBLICATIONS

Zhou et al, "An Uplink Medium Access Protocol with SDMA Support for Multiple-Antenna WLANs," Wireless Communications and Networking Conference, pp. 1809-1814, Institute of Electrical and Electronics Engineers, New York, New York (2008).

(Continued)

*Primary Examiner* — Khaled Kassim
*Assistant Examiner* — Syed S Ali
(74) *Attorney, Agent, or Firm* — Leydig, Voit & Mayer, Ltd.

(57) ABSTRACT

The present invention provides a method, a device and a system for transmitting data, which relate to the field of network technology. A station sends a request-to-send frame to an access point to obtain a channel, at the same time, the access point actively sends a middle-clear-to-send frame, so as to indicate which stations can send data, thereby reducing the time overhead in the data transmission process, improving the flexibility of the system, and avoiding system errors. Specifically, the method includes: an access point AP receives a request-to-send RTS frame sent by a station STA; sends a middle-clear-to-send MCTS frame to a scheduled STA; receives an F frame sent by the scheduled STA according to the MCTS frame; sends a final-clear-to-send FCTS frame to another scheduled STA; and receives data (Continued)

sent by the another scheduled STA according to the FCTS frame. The present invention is applied to data transmission.

10 Claims, 2 Drawing Sheets

(56) References Cited

U.S. PATENT DOCUMENTS

| | | | |
|---|---|---|---|
| 2006/0029073 A1* | 2/2006 | Cervello | H04W 74/0816 370/389 |
| 2006/0050742 A1* | 3/2006 | Grandhi | H04W 74/0816 370/506 |
| 2011/0235576 A1* | 9/2011 | Gong | H04W 74/0816 370/328 |
| 2012/0147804 A1 | 6/2012 | Hedayat et al. | |
| 2012/0224540 A1 | 9/2012 | Kwon et al. | |
| 2013/0188610 A1* | 7/2013 | Fischer | H04W 52/0229 370/336 |
| 2013/0343341 A1 | 12/2013 | Kim et al. | |
| 2014/0003414 A1* | 1/2014 | Choudhury | H04W 74/006 370/347 |
| 2014/0050173 A1* | 2/2014 | Yang | H04W 28/20 370/329 |
| 2014/0328313 A1* | 11/2014 | Merlin | H04B 7/2621 370/330 |
| 2014/0334387 A1* | 11/2014 | Doppler | H04W 74/0816 370/329 |
| 2015/0230245 A1* | 8/2015 | Choi | H04W 74/0816 370/329 |
| 2015/0365973 A1* | 12/2015 | Choi | H04W 74/0816 370/336 |
| 2016/0044711 A1* | 2/2016 | Lou | H04W 74/0816 370/338 |

FOREIGN PATENT DOCUMENTS

| | | |
|---|---|---|
| CN | 102404852 A | 4/2012 |
| CN | 102792757 A | 11/2012 |
| JP | 2010045784 A | 2/2010 |

OTHER PUBLICATIONS

Jin et al., "Performance Comparison of Uplink WLANs with Single-user and Multi-user MIMO Schemes," Wireless Communications and Networking Conference, WCNC 2008, Institute of Electrical and Electronics Engineers, New York, New York (Mar. 31-Apr. 3, 2008).

* cited by examiner

METHOD, DEVICE AND SYSTEM FOR TRANSMITTING DATA

CROSS-REFERENCE TO RELATED APPLICATIONS

This application is a continuation of International Patent Application No. PCT/CN2013/087240, filed on Nov. 15, 2013, which claims priority to Chinese Patent Application No. 201310155579.4, filed on Apr. 28, 2013, both of which are hereby incorporated by reference in their entireties.

TECHNICAL FIELD

The present invention relates to field of network technology and, in particular, to a method, a device and a system for transmitting data.

BACKGROUND

In a traditional wireless local area network, when multiple stations simultaneously send data to an access point, a collision may occur because a receiver can only receive data of a single station correctly. Carrier sense multiple access with collision avoidance (Carrier sense multiple access with collision avoidance, CSMA/CA) is generally adopted in the prior art to avoid occurrence of collision. In a new generation of wireless local area network, the problem of collision is solved in an uplink multi-user multi-input multi-output (multi input multi output, MIMO) manner. Such a receiver has capability of multi-packet reception and thus can correctly receive data sent from a plurality of stations. Furthermore, the introduction of the uplink multi-user MIMO can increase uplink throughput.

In the uplink multi-user MIMO, there are two types of access modes currently, one is completely free contention access performed by stations, the other is completely scheduling by access points to decide which station can access. However, the mode of completely free contention access by stations needs large time consumption and too complicated procedures; while the mode of completely scheduling by access points lacks flexibility. When the station has burst data to be sent, the access point cannot respond in time. Meanwhile, the two current access modes haven't considered the case that the difference between data packet lengths of the data sent by each station is too large, and there is a case that one data packet uploaded by a station is too long while another data packet uploaded by a station at the same time with the STA is too small, and this may cause a waste of the spatial stream. Moreover, in the uplink multi-user MIMO, each station does not complete data transmission at the same time, but the access point must reply an acknowledgment frame only after the data of all the stations is received. The station which completes sending will start a retransmission mechanism if the acknowledgment frame is not received within a certain period, and this will cause system errors.

SUMMARY

Embodiments of the present invention provide a method, a device and a system for transmitting data, thereby reducing the time overhead in the data transmission process, improving the flexibility of the system, and avoiding system errors.

Embodiments of the present invention provide technical solutions as follows:

In a first aspect, a method for transmitting data is provided, including:

receiving, by an access point AP, a request-to-send RTS frame sent by a station STA, so as to facilitate the STA to obtain a channel for sending data;

sending, by the AP, a middle-clear-to-send MCTS frame to the scheduled STA; particularly, the MCTS frame is used for indicating an address of the STA scheduled by the AP and a sequence of sending a feedback F frame by the scheduled STA;

receiving, by the AP, the F frame sent by the scheduled STA according to the MCTS frame; particularly, the F frame is used for indicating a time needed for sending data by the STA;

sending, by the AP, a final-clear-to-send FCTS frame to another scheduled STA; particularly, the FCTS frame is used for indicating a time needed for sending data by the another scheduled STA; and receiving, by the AP, the data sent by the another scheduled STA according to the FCTS frame.

Combining the first aspect, in a first possible implementation, after receiving, by the AP, the data sent by the another scheduled STA according to the FCTS frame, the method further includes:

sending, by the AP, an acknowledgment ACK frame to the another scheduled STA if the data is received; particularly, the ACK frame is sent after all the data is received by the AP.

Combining the first aspect or the first possible implementation, in a second possible implementation, the MCTS frame includes: a frame control field, a duration field, fields of addresses of all the receiving ends and a frame check sequence FCS field; particularly, the frame control field is used for indicating attribute information of the MCTS frame; the duration field is used for indicating a time period of sending the MCTS frame to the STA by the AP; the fields of the addresses of all the receiving ends refer to all the addresses of the STAs scheduled by the AP.

Combining the first aspect or the first possible implementation In a third possible implementation, the F frame includes: a frame control field, a data amount field, a field of an address of a receiving end, a field of an address of a sending end and an FCS field; particularly, the frame control field is used for indicating attribute information of the F frame; the data amount field refers to a data amount of the data to be sent by the STA which sends the F frame; the field of the address of the sending end refers to an address of the STA which sends the F frame; and the field of the address of the receiving end refers to an address of the AP which receives the F frame.

Combining the first aspect or the first possible implementation, in a fourth possible implementation, the FCTS frame includes: a frame control field, a first duration field, fields of addresses of all the receiving ends, all the second duration fields, an acknowledgment time field and an FCS field; particularly, the frame control field is used for indicating attribute information of the FCTS frame; the first duration field refers to a time period of sending the FCTS frame to the STA by the AP; the fields of the addresses of all the receiving ends refer to all the addresses of the STAs scheduled by the AP; the second duration field refers to a time needed for receiving each data by the AP; and the acknowledgment time field refers to a time needed for sending an acknowledgment frame by the AP.

Combining the first aspect or the first possible implementation, in a fifth possible implementation, the ACK frame includes: a frame control field, a duration field, fields of addresses of all the receiving ends and an FCS field; particularly, the frame control field is used for indicating attribute information of the ACK frame; the duration field is used for indicating a time period of sending the ACK frame to the STA by the AP; the addresses of all the receiving ends refer to the addresses of all the STAs corresponding to the data received by the AP.

In a second aspect, a device for transmitting data is provided, including:

a receiving unit, configured to receive, by an access point AP, a request-to-send RTS frame sent by a station STA, so as to facilitate the STA to obtain a channel for sending data; and a sending unit, configured to send a middle-clear-to-send MCTS frame to a scheduled STA; particularly, the MCTS frame is used for indicating an address of the STA scheduled by the AP and a sequence of sending a feedback F frame by the scheduled STA;

the receiving unit is further configured to receive the F frame sent by the scheduled STA according to the MCTS frame; particularly, the F frame is used for indicating a time needed for sending data by the STA;

the sending unit is further configured to send a final-clear-to-send FCTS frame to another scheduled STA; particularly, the FCTS frame is used for indicating a time needed for sending data by the another scheduled STA; and the receiving unit is further configured to receive data sent by the another scheduled STA according to the FCTS frame.

Combining the second aspect, in a first possible implementation, the sending unit is further configured to send an acknowledgment ACK frame to the another scheduled STA if the data is received by the AP; particularly, the ACK frame is sent after all the data is received by the AP.

Combining the second aspect or the first possible implementation, in a second possible implementation, the MCTS frame includes: a frame control field, a duration field, fields of addresses of all the receiving ends and a frame check sequence FCS field; particularly, the frame control field is used for indicating attribute information of the MCTS frame; the duration field is used for indicating a time period of sending the MCTS frame to the STA by the AP; the fields of the addresses of all the receiving ends refer to all the addresses of the STAs scheduled by the AP.

Combining the second aspect or the first possible implementation, in a third possible implementation, the F frame includes: a frame control field, a data amount field, a field of an address of a receiving end, a field of an address of a sending end and an FCS field; particularly, the frame control field is used for indicating attribute information of the F frame; the data amount field refers to a data amount of the data to be sent by the STA which sends the F frame; the field of the address of the sending end refers to an address of the STA which sends the F frame; and the field of the address of the receiving end refers to an address of the AP which receives the F frame.

Combining the second aspect or the first possible implementation, in a fourth possible implementation, the FCTS frame includes: a frame control field, a first duration field, fields of addresses of all the receiving ends, all the second duration fields, an acknowledgment time field and an FCS field; particularly, the frame control field is used for indicating attribute information of the FCTS frame; the first duration field refers to a time period of sending the FCTS frame to the STA by the AP; the fields of the addresses of all the receiving ends refer to all the addresses of the STAs scheduled by the AP; the second duration field refers to a time needed for receiving each data by the AP; and the acknowledgment time field refers to a time needed for sending an acknowledgment frame by the AP.

Combining the second aspect or the first possible implementation, in a fifth possible implementation, the ACK frame includes: a frame control field, a duration field, fields of addresses of all the receiving ends and an FCS field; particularly, the frame control field is used for indicating attribute information of the ACK frame; the duration field is used for indicating a time period of sending the ACK frame to the STA by the AP; the addresses of all the receiving ends refer to the addresses of all the STAs corresponding to the data received by the AP.

In a third aspect, a system for transmitting data is provided, including an access point AP and a station STA, the STA is configured to send a request-to-send RTS frame to the AP, receive a middle-clear-to-send MCTS frame sent by the AP, send a feedback F frame to the AP according to the MCTS frame, receive a final-clear-to-send FCTS frame sent by the AP, and send data to the AP according to the FCTS frame;

the AP is configured to receive the RTS frame sent by the station STA, send the MCTS frame to a scheduled STA, receive the F frame sent by the scheduled STA according to the MCTS frame, send the FCTS frame to another scheduled STA, and receive data sent by the another scheduled STA according to the FCTS frame.

Combining the third aspect, in a first possible implementation, the AP is further configured to send an acknowledgment ACK frame to the another scheduled STA if the data is received by the AP;

the STA is further configured to receive the ACK frame sent by the AP.

In the method, the device and the system for transmitting data provided in the embodiments of the present invention, the station sends the request-to-send frame to the access point to obtain the channel, and at the same time, the access point actively sends the middle clear-to-send frame, so as to indicate which stations can send data, thereby reducing the time overhead in the data transmission process, improving the flexibility of the system, and avoiding system errors.

DESCRIPTION OF EMBODIMENTS

Figure 1:
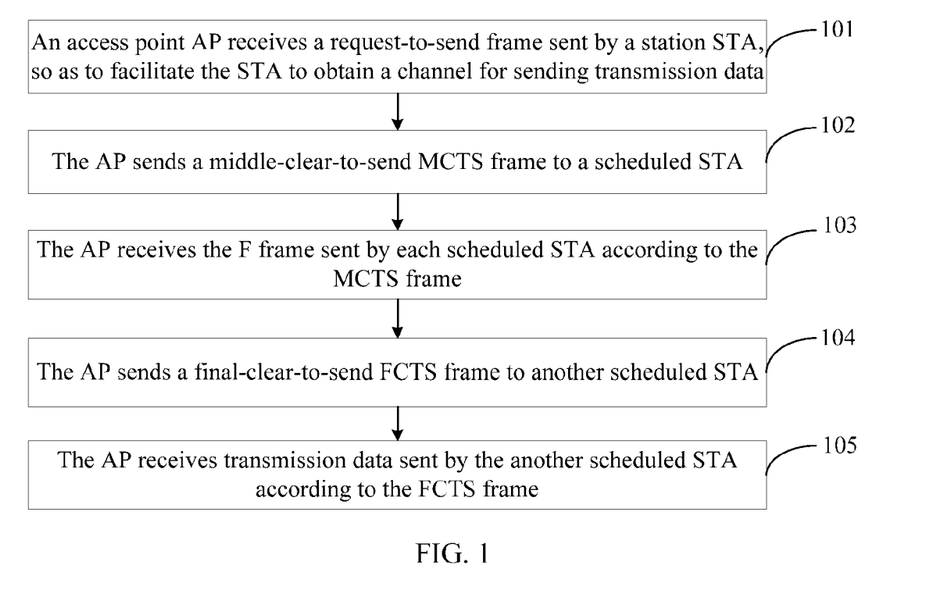
FIG. 1 is a schematic flow chart of a method for transmitting data according to an embodiment of the present invention.

Embodiments of the present invention provide a method for transmitting data, as shown in FIG. 1, the method includes:

101, An access point (Access Point, AP) receives a request-to-send (Request to send, RTS) frame sent by a station (Station, STA), so as to facilitate the STA to obtain a channel for sending data.

In particular embodiments, it can be the case that an RTS sent by any station within the system is received.

102, The AP sends a middle-clear-to-send (middle clear to send, MCTS) frame to a scheduled STA; particularly, the MCTS frame is used for indicating an address of the STA scheduled by the AP and a sequence of sending a feedback (feedback, F) frame by the scheduled STA.

Particularly, the AP can obtain an address of the STA to be scheduled through the previous frame exchange information, and the STA to be scheduled is the STA scheduled by the AP within all the STAs.

103, The AP receives the F frame sent by each scheduled STA according to the MCTS frame; particularly, the F frame is used for indicating a time needed for sending data by the scheduled STA.

104, The AP sends a final-clear-to-send (Final clear to send, FCTS) frame to another scheduled STA; particularly, the FCTS frame is used for indicating a time needed for sending data by the another scheduled STA.

105, The AP receives data sent by the another scheduled STA according to the FCTS frame.

In particular embodiments, if the AP receives the RTS sent by any station within the system, then sends FCTS to each scheduled STA. Then, the AP receives data sent by each scheduled STA.

In the method for transmitting data provided in the embodiments of the present invention, the station sends the request-to-send frame to the access point to obtain the channel, and at the same time, the access point actively sends the middle-clear-to-send frame, so as to indicate which stations can send data, thereby reducing the time overhead in the data transmission process, improving the flexibility of the system, and avoiding system errors.

Figure 2:
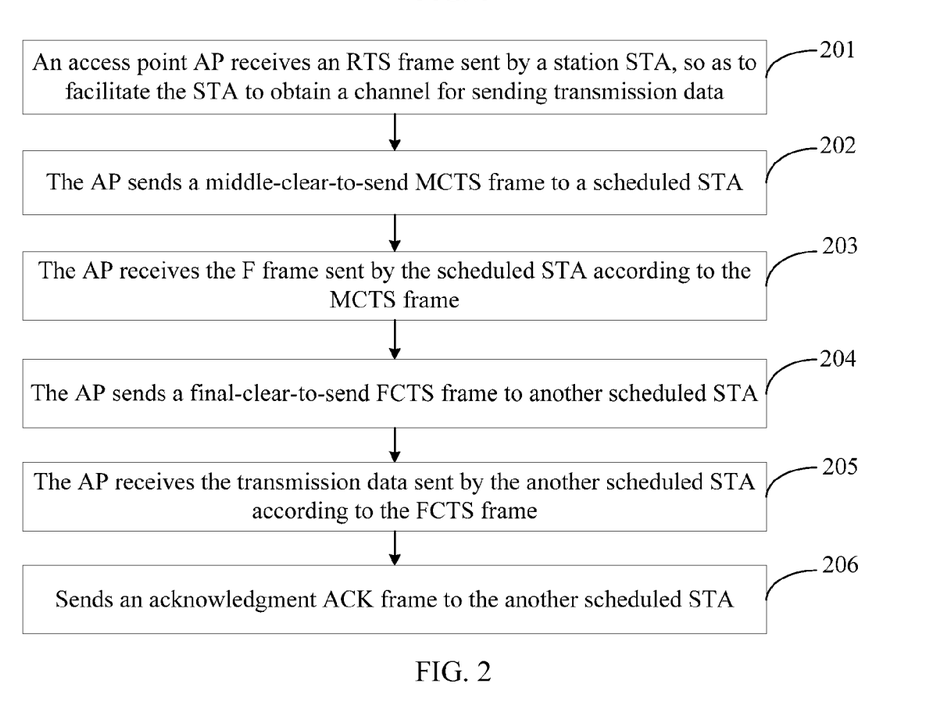
FIG. 2 is a schematic flow chart of another method for transmitting data according to an embodiment of the present invention.

Embodiments of the present invention provide a method for transmitting data, as shown in FIG. 2, including:

201, An access point AP receives an RTS frame sent by a station STA, so as to facilitate the STA to obtain a channel for sending data.

In particular embodiments, it can be the case that an RTS sent by any station within the system is received.

Particularly, the RTS frame includes: a frame control field, a duration field, an address of a receiving end, an address of a sending end and a frame check sequence (frame check sequence, FCS) field; the frame control field is used for indicating attribute information of the RTS frame; the duration field is used for indicating a time period of sending the RTS frame to the AP by the STA; the address of the receiving end refers to an address of the AP of receiving the RTS frame; and the address of the sending end refers to an address of the STA of sending the RTS frame.

202, The AP sends a middle-clear-to-send MCTS frame to a scheduled STA; particularly, the MCTS frame is used for indicating an address of the STA scheduled by the AP and a sequence of sending a feedback F frame by the scheduled STA.

The MCTS frame includes: a frame control field, a duration field, fields of addresses of all the receiving ends and a frame check sequence FCS field; the frame control field is used for indicating attribute information of the MCTS frame; the duration field is used for indicating a time period of sending the MCTS frame to the STA by the AP; the fields of the addresses of all the receiving ends refer to all the addresses of the STAs scheduled by the AP.

203, The AP receives the F frame sent by the scheduled STA according to the MCTS frame; particularly, the F frame is used for indicating a time needed for sending data by the STA.

The F frame includes: a frame control field, a data amount field, a field of an address of a receiving end, a field of an address of a sending end and an FCS field; particularly, the frame control field is used for indicating attribute information of the F frame; the data amount field refers to a data amount of the data to be sent by the STA which sends the F frame; the field of the address of the sending end refers to an address of the STA which sends the F frame; and the field of the address of the receiving end refers to an address of the AP which receives the F frame.

Particularly, because the F frame includes a data amount of the data to be sent by the STA, then a time needed for sending the data by the STA can be obtained according to a transmission speed and a data amount of a spatial stream. The time needed for sending data by all the scheduled STAs is acquired, a maximum value of the required time is used as a reference, then data of different STAs can be transmitted in the same spatial stream, however, the overall time needed for sending the data in the same spatial stream cannot exceed the maximum time needed for sending the data by the STA. If the data of multiple STAs is sent in the same spatial stream, then a waste of the spatial stream can be reduced.

204, The AP sends a final-clear-to-send FCTS frame to another scheduled STA; particularly, the FCTS frame is used for indicating a time needed for sending data by the another scheduled STA.

In particular embodiments, if the AP receives the RTS sent by any station within the system, then sends FCTS to each scheduled STA.

The FCTS frame includes: a frame control field, a first duration field, fields of addresses of all the receiving ends, all the second duration fields, an acknowledgment time field and an FCS field; particularly, the frame control field is used for indicating attribute information of the FCTS frame; the first duration field refers to a time period of sending the FCTS frame to the STA by the AP; the fields of the addresses of all the receiving ends refer to all the addresses scheduled by the AP; the second duration field refers to a time needed for receiving each data by the AP; and the acknowledgment time field refers to a time needed for sending an acknowledgment frame by the AP.

205, The AP receives the data sent by the another scheduled STA according to the FCTS frame.

In particular embodiments, if the AP sends the FCTS to each scheduled STA, then receives data sent by each scheduled STA.

Particularly, data is sent to the access point AP through a spatial stream.

If the AP receives the FCTS frame sent by the STA, then Step 206 is performed;

206, Sends an acknowledgment ACK frame to the another scheduled STA; particularly, the ACK frame is sent after all the data is received by the AP.

In particular embodiments, if the AP receives data sent by each scheduled STA, then sends the ACK frame to each scheduled STA.

The ACK frame includes: a frame control field, a duration field, fields of addresses of all the receiving ends and an FCS field; wherein, the frame control field is used for indicating attribute information of the ACK frame; the duration field is used for indicating a time period of sending the ACK frame to the STA by the AP; the addresses of all the receiving ends refer to the addresses of all the STAs corresponding to the data received by the AP.

In the embodiments of the present invention, the ACK frame is preferably sent in a broadcast manner. Of course, the sending manner of the ACK frame is not limited here, and can be selected appropriately according to the practical application scenario.

Particularly, the reply time of the ACK frame is definite. Since the time needed for sending the data of all the scheduled STAs can be known from the F frame, that is, the moment of completing the sending of all the data to be sent can be known. The ACK frame is sent after all the data is received, therefore, the STA can know the sending time of the ACK frame. Each scheduled STA starts timing at a certain moment according to the sending time of the ACK frame, if no ACK frame is received within a predefined time period, then the STA will re-send the data to the AP. In this way, the STA can avoid unnecessary retransmission of the data, and thus avoid system errors.

Particularly, the frame control field in all the frame structures described above in this embodiment specifically refers to the following information of corresponding frame structure: version, control type, chart type, information of data segment register, more fragments, whether there is a need to retry, power management, more data, and whether is protected frame and sequencing.

In the method for transmitting data provided in the embodiments of the present invention, the station sends the request-to-send frame to the access point to obtain the channel, and at the same time, the access point actively sends the middle-clear-to-send frame, so as to indicate which stations can send data, thereby reducing the time overhead in the data transmission process, improving the flexibility of the system, and avoiding system errors. Furthermore, a waste of the spatial stream can be reduced.

Figure 3:
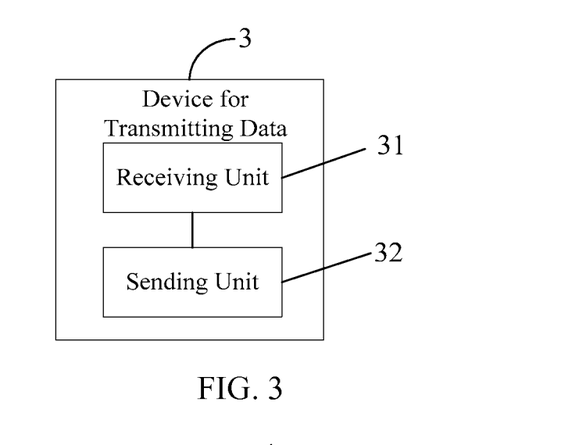
FIG. 3 is a schematic structural diagram of a device for transmitting data according to an embodiment of the present invention.

Embodiments of the present invention provide a device 3 for transmitting data, as shown in FIG. 3, the device includes a receiving unit 31 and a sending unit 32, particularly:

the receiving unit 31 is configured to receive, by an access point AP, an RTS frame sent by a station STA, so as to facilitate the STA to obtain a channel for sending data.

The sending unit 32 is configured to send a middle-clear-to-send MCTS frame to a scheduled STA; particularly, the MCTS frame is used for indicating an address of the STA scheduled by the AP and a sequence of sending a feedback F frame by the scheduled STA.

The receiving unit 31 is further configured to receive the F frame sent by the scheduled STA according to the MCTS frame; particularly, the F frame is used for indicating a time needed for sending data by the STA.

The sending unit 32 is further configured to send a final-clear-to-send FCTS frame to another scheduled STA; the FCTS frame is used for indicating a time needed for sending data by the another scheduled STA.

The receiving unit 31 is further configured to receive data sent by the another scheduled STA according to the FCTS frame.

In the device for transmitting data provided in the embodiments of the present invention, a mode of station competition in combination with access point scheduling is adopted, thereby reducing the time overhead in the data transmission process, improving the flexibility of the system, and avoiding system errors.

Further, the device for transmitting data provided in the embodiments of the present invention also includes:

the sending unit 32, further configured to send an acknowledgment ACK frame to the another scheduled STA if the data is received by the AP.

Particularly, the ACK frame is sent after all the data is received by the AP.

The MCTS frame includes: a frame control field, a duration field, fields of addresses of all the receiving ends and a frame check sequence FCS field; wherein, the frame control field is used for indicating attribute information of the MCTS frame; the duration field is used for indicating a time period of sending the MCTS frame to the STA by the AP; the fields of the addresses of all the receiving ends refer to all the addresses of the STAs scheduled by the AP.

The F frame includes: a frame control field, a data amount field, a field of an address of a receiving end, a field of an address of a sending end and an FCS field; particularly, the frame control field is used for indicating attribute information of the F frame; the data amount field refers to a data amount of the data to be sent by the STA which sends the F frame; the field of the address of the sending end refers to an address of the STA which sends the F frame; and the field of the address of the receiving end refers to an address of the AP which receives the F frame.

The FCTS frame includes: a frame control field, a first duration field, fields of addresses of all the receiving ends, all the second duration fields, an acknowledgment time field and an FCS field; particularly, the frame control field is used for indicating attribute information of the FCTS frame; the first duration field refers to a time period of sending the FCTS frame to the STA by the AP; the fields of the addresses of all the receiving ends refer to all the addresses scheduled by the AP; the second duration field refers to a time needed for receiving each data by the AP; and the acknowledgment time field refers to a time needed for sending an acknowledgment frame by the AP.

The ACK frame includes: a frame control field, a duration field, fields of addresses of all the receiving ends and an FCS field; wherein, the frame control field is used for indicating attribute information of the ACK frame; the duration field is used for indicating a time period of sending the ACK frame to the STA by the AP; the addresses of all the receiving ends refer to the addresses of all the STAs corresponding to the data received by the AP.

In the device for transmitting data provided in the embodiments of the present invention, the station sends the request-to-send frame to the access point to obtain the channel, and at the same time, the access point actively sends the middle-clear-to-send frame, so as to indicate which stations can send data, thereby reducing the time overhead in the data transmission process, improving the flexibility of the system, and avoiding system errors. Then, a waste of the spatial stream can be reduced.

Figure 4:
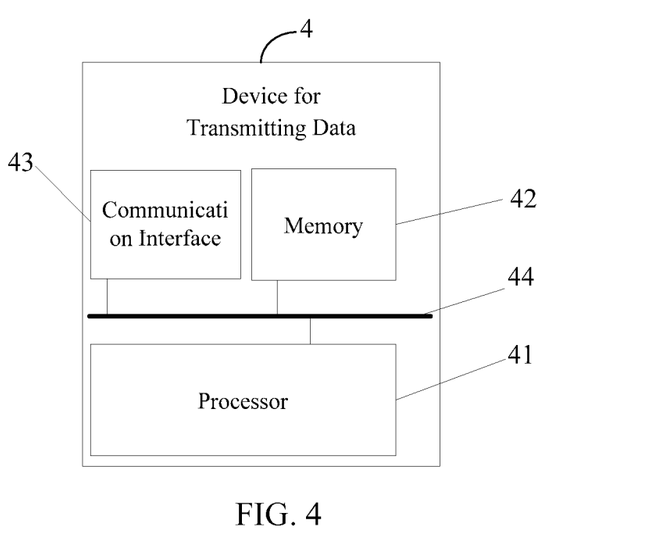
FIG. 4 is a schematic structural diagram of another device for transmitting data according to an embodiment of the present invention.

Embodiments of the present invention provide a device 4 for transmitting data, as shown in FIG. 4, the device includes: at least one processor 41, a memory 42, a communication interface 43 and a bus 44, particularly, the at least one processor 41, the memory 42, and the communication interface 43 are connected via the bus 44 and communicate with one another, where:

The bus 44 can be an industry standard architecture (Industry Standard Architecture, ISA) bus, a peripheral component interconnect (Peripheral Component Interconnect, PCI) bus, or an extended industry standard architecture (Extended Industry Standard Architecture, EISA) bus, or the like. The bus 44 can be classified into an address bus, a data bus, a control bus, or the like. For ease of illustration, it is shown in FIG. 4 as only one bold line, which doesn't mean there is only one bus or one type of bus.

The memory 42 is configured to store an executable program code including computer operation instructions. The memory 42 may include a high-speed RAM memory, or a non-volatile memory, such as at least one magnetic disk memory.

The processor 41 can be a central processing unit (Central Processing Unit, CPU), or an application specific integrated circuit (Application Specific Integrated Circuit, ASIC), or configured as one or more integrated circuits for implementing the embodiments of the present invention.

The communication interface 43 is mainly configured to enable communication between the access point and the station in this embodiment.

The processor 41 is also configured to invoke the program code in the memory 42, so as to perform operations as follows:

An access point AP receives an RTS frame sent by a station STA, so as to facilitate the STA to obtain a channel for sending data.

Send a middle-clear-to-send MCTS frame to a scheduled STA; particularly, the MCTS frame is used for indicating an address of the STA scheduled by the AP and a sequence of sending a feedback F frame by the scheduled STA.

Receive the F frame sent by the scheduled STA according to the MCTS frame.

Particularly, the F frame is used for indicating a time needed for sending data by the STA.

Send a final-clear-to-send FCTS frame to another scheduled STA,

Particularly, the FCTS frame is used for indicating a time needed for sending data by the another scheduled STA.

Receive data sent by the another scheduled STA according to the FCTS frame.

Furthermore, the processor 41 is further configured to perform operations as follows:

Send an acknowledgment ACK frame to the another scheduled STA if the data is received by the AP; wherein, the ACK frame is sent after all the data is received by the AP.

The MCTS frame includes: a frame control field, a duration field, fields of addresses of all the receiving ends and a frame check sequence FCS field; wherein, the frame control field is used for indicating attribute information of the MCTS frame; the duration field is used for indicating a time period of sending the MCTS frame to the STA by the AP; the fields of the addresses of all the receiving ends refer to all the addresses of the STAs scheduled by the AP.

The F frame includes: a frame control field, a data amount field, a field of an address of a receiving end, a field of an address of a sending end and an FCS field; particularly, the frame control field is used for indicating attribute information of the F frame; the data amount field refers to a data amount of the data to be sent by the STA which sends the F frame; the field of the address of the sending end refers to an address of the STA which sends the F frame; and the field of the address of the receiving end refers to an address of the AP which receives the F frame.

The FCTS frame includes: a frame control field, a first duration field, fields of addresses of all the receiving ends, all the second duration fields, an acknowledgment time field and an FCS field; particularly, the frame control field is used for indicating attribute information of the FCTS frame; the first duration field refers to a time period of sending the FCTS frame to the STA by the AP; the fields of the addresses of all the receiving ends refer to all the addresses of the STAs scheduled by the AP; the second duration field refers to a time needed for receiving each data by the AP; and the acknowledgment time field refers to a time needed for sending an acknowledgment frame by the AP.

The ACK frame includes: a frame control field, a duration field, fields of addresses of all the receiving ends and an FCS field; wherein, the frame control field is used for indicating attribute information of the ACK frame; the duration field is used for indicating a time period of sending the ACK frame to the STA by the AP; the addresses of all the receiving ends refer to the addresses of all the STAs corresponding to the data received by the AP.

In the device for transmitting data provided in the embodiments of the present invention, the station sends the request-to-send frame to the access point to obtain the channel, and at the same time, the access point actively sends the middle-clear-to-send frame, so as to indicate which stations can send data, thereby reducing the time overhead in the data transmission process, improving the flexibility of the system, and avoiding system errors. Furthermore, a waste of the spatial stream can be reduced.

Figure 5:
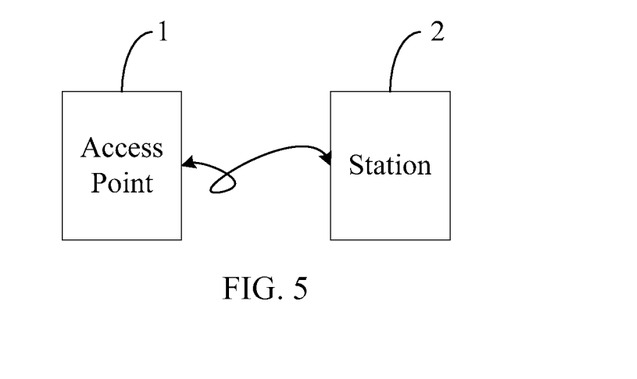
FIG. 5 is a schematic structural diagram of a system for transmitting data according to an embodiment of the present invention.

The embodiments of the present invention provide a system for transmitting data, as shown in FIG. 5, the system includes an access point AP1 and a station STA2, particularly:

the STA2 is configured to send a request-to-send RTS frame to the AP1, receive a middle-clear-to-send MCTS frame sent by the AP1, send a feedback F frame to the AP1 according to the MCTS frame, receive a final-clear-to-send FCTS frame sent by the AP1, and send data to the AP1 according to the FCTS frame.

The AP1 is configured to receive the RTS frame sent by any STA2, send the MCTS frame to a scheduled STA2, receive the F frame sent by the scheduled STA2 according to the MCTS frame, send the FCTS frame to another scheduled STA2, and receive the data sent by the another scheduled STA2 according to the FCTS frame.

Further, the AP1 is further configured to send an acknowledgment ACK frame to the another scheduled STA2 if the data is received by the AP1.

The STA2 is further configured to receive the ACK frame sent by the AP1.

The MCTS frame includes: a frame control field, a duration field, fields of addresses of all the receiving ends and a frame check sequence FCS field; wherein, the frame control field is used for indicating attribute information of the MCTS frame; the duration field is used for indicating a time period of sending the MCTS frame to the STA by the AP; the fields of the addresses of all the receiving ends refer to all the addresses of the STAs scheduled by the AP.

The F frame includes: a frame control field, a data amount field, a field of an address of a receiving end, a field of an address of a sending end and an FCS field; particularly, the frame control field is used for indicating attribute information of the F frame; the data amount field refers to a data amount of the data to be sent by the STA which sends the F frame; the field of the address of the sending end refers to an address of the STA which sends the F frame; and the field of the address of the receiving end refers to an address of the AP which receives the F frame.

The FCTS frame includes: a frame control field, a first duration field, fields of addresses of all the receiving ends, all the second duration fields, an acknowledgment time field and an FCS field; particularly, the frame control field is used for indicating attribute information of the FCTS frame; the first duration field refers to a time period of sending the FCTS frame to the STA by the AP; the fields of addresses of all the receiving ends refer to all the addresses of the STAs scheduled by the AP; the second duration field refers to a time needed for receiving each data by the AP; and the acknowledgment time field refers to a time needed for sending an acknowledgment frame by the AP.

The ACK frame includes: a frame control field, a duration field, fields of addresses of all the receiving ends and an FCS field; wherein, the frame control field is used for indicating attribute information of the ACK frame; the duration field is used for indicating a time period of sending the ACK frame to the STA by the AP; the addresses of all the receiving ends refer to the addresses of all the STAs corresponding to the data received by the AP.

In the system for transmitting data provided in the embodiments of the present invention, the station sends the request-to-send frame to the access point to obtain the channel, and at the same time, the access point actively sends the middle-clear-to-send frame, so as to indicate which stations can send data, thereby reducing the time overhead in the data transmission process, improving the flexibility of the system, and avoiding system errors. Furthermore, a waste of the spatial stream can be reduced.

It should be appreciated by persons skilled in the art that, all or a part of the steps in the method of the above embodiments may be completed by relevant hardware under the instructions of a program, and the program may be stored in a computer readable storage medium, when the program is executed, the steps in the method of the above embodiments are performed; the storage medium includes various media capable of storing program codes, such as a read only memory (ROM), a random access memory (RAM), a floppy disk, or an optical disk and the like.

What is claimed is:

1. A method for transmitting data comprising:
   receiving, by an access point (AP), a request-to-send (RTS) frame sent by a station (STA), so as to facilitate the STA obtaining a channel for sending data;
   sending, by the AP, a middle-clear-to-send (MCTS) frame to the STA, wherein the MCTS frame indicates an address of the STA and a sequence of sending a feedback F frame by the STA, where the F frame comprises fields for (a) indicating attribute information of the F frame, (b) referring to an amount of data to be sent by the STA sending the F frame, (c) an address of a receiving end referring to an address of the AP that receives the F frame, (d) an address of a sending end referring to an address of the STA that sends the F frame and (e) providing a frame check sequence (FCS);
   receiving, by the AP, the F frame sent by the scheduled STA according to the MCTS frame, wherein the F frame indicates a time needed for sending data by the STA;
   sending, by the AP, a final-clear-to-send (FCTS) frame to another STA, wherein the FCTS frame indicates a time needed for sending data by said another STA;
   receiving, by the AP, the data sent by said another STA according to the FCTS frame; and
   sending, by the AP, an acknowledgment (ACK) frame to said another STA if the sent data is received by the AP, wherein the ACK frame comprises fields for (a) indicating attribute information of the ACK frame, (b) indicating a time period of sending the ACK frame to the STA by the AP and (c) addresses of all STAs corresponding to the sent data received by the AP.

2. The method according to claim 1, wherein, wherein the ACK frame is sent after all the sent data is received by the AP.

3. The method according to claim 1, wherein the MCTS frame comprises fields for indicating (a) attribute information of the MCTS frame, (b) a time period of sending the MCTS frame to the STA by the AP, (c) and all addresses of STAs scheduled by the AP.

4. The method according to claim 1, wherein the FCTS frame comprises fields for indicating (a) attribute information of the FCTS frame, (b) a time period of sending the FCTS frame to the STA by the AP, (c) all addresses of STAs scheduled by the AP, (d) a time needed for receiving each data by the AP, (e) and a time needed for sending an acknowledgment frame by the AP.

5. A device for transmitting data comprising a processor and a memory for storing executable instructions that when executed by the processor configures the processor to:
   receive, by an access point AP, a request-to-send RTS frame sent by a station STA, so as to facilitate the STA to obtain a channel for sending data; and
   send a middle-clear-to-send MCTS frame to a scheduled STA; wherein, the MCTS frame is used for indicating an address of the STA scheduled by the AP and a sequence of sending a feedback F frame by the scheduled STA, where the F frame comprises fields for (a) indicating attribute information of the F frame, (b) referring to an amount of data to be sent by the STA sending the F frame, (c) an address of a receiving end referring to an address of the AP that receives the F frame, (d) an address of a sending end referring to an address of the STA that sends the F frame and (e) providing a frame check sequence (FCS);
   receive the F frame sent by the scheduled STA according to the MCTS frame; wherein, the F frame is used for indicating a time needed for sending data by the STA;
   send a final-clear-to-send FCTS frame to another scheduled STA; wherein, the FCTS frame is used for indicating a time needed for sending data by said another scheduled STA;
   receive data sent by said another scheduled STA according to the FCTS frame; and
   send an acknowledgment ACK frame to said another STA if the sent data is received by the AP, wherein the ACK frame comprises fields for (a) indicating attribute information of the ACK frame, (b) indicating a time period of sending the ACK frame to the STA by the AP and (c) addresses of all STAs corresponding to the sent data received by the AP.

6. The device according to claim 5, wherein the ACK frame is sent after all the sent data is received by the AP.

7. The device according to claim 5, wherein the MCTS frame comprises fields for indicating (a) attribute information of the MCTS frame, (b) a time period of sending the MCTS frame to the STA by the AP, (c) and all the addresses of the STAs scheduled by the AP.

8. The device according to claim 5, wherein the FCTS frame comprises fields for indicating (a) attribute information of the FCTS frame, (b) a time period of sending the FCTS frame to the STA by the AP, (c) all addresses of STAs scheduled by the AP, (d) a time needed for receiving each data by the AP, (e) a time needed for sending an acknowledgment frame by the AP.

9. A system for transmitting data comprising an access point AP and a station STA, wherein:
   the STA is configured to send a request-to-send RTS frame to the AP, receive a middle-clear-to-send MCTS frame sent by the AP, send a feedback F frame to the AP according to the MCTS frame, receive a final-clear-to-send FCTS frame sent by the AP, and send data to the AP according to the FCTS frame, where the F frame comprises fields for (a) indicating attribute information of the F frame, (b) referring to an amount of data to be sent by the STA sending the F frame, (c) an address of a receiving end referring to an address of the AP that receives the F frame, (d) an address of a sending end referring to an address of the STA that sends the F frame and (e) providing a frame check sequence (FCS);

the AP is configured to receive the RTS frame sent by the station STA, send the MCTS frame to a scheduled STA, receive the F frame sent by the scheduled STA according to the MCTS frame, send the FCTS frame to another scheduled STA, and receive data sent by said another scheduled STA according to the FCTS frame; and the AP is further configured to send an acknowledgment ACK frame to said another scheduled STA if the sent data is received by the AP, wherein the ACK frame comprises fields for (a) indicating attribute information of the ACK frame, (b) indicating a time period of sending the ACK frame to the STA by the AP and (c) addresses of all STAs corresponding to the sent data received by the AP.

10. The system according to claim 9, wherein the STA is further configured to receive the ACK frame sent by the AP.

* * * * *